(12) United States Patent
Minshall

(10) Patent No.: US 6,196,774 B1
(45) Date of Patent: Mar. 6, 2001

(54) CUTTING INSERT

(75) Inventor: Gerald Minshall, Alcester (GB)

(73) Assignees: Bencere Ltd., Hook Norton (GB); Elliot Tool Technologies Inc., Dayton, OH (US)

(*) Notice: Subject to any disclaimer, the term of this patent is extended or adjusted under 35 U.S.C. 154(b) by 0 days.

(21) Appl. No.: 09/329,728

(22) Filed: Jun. 10, 1999

(30) Foreign Application Priority Data

Jun. 12, 1998 (GB) .................................................. 9812571

(51) Int. Cl.⁷ .............................. B23B 27/16; B23B 51/00
(52) U.S. Cl. ........................ 408/233; 407/40; 407/107; 408/713
(58) Field of Search .................................... 408/231, 233, 408/713; 407/40, 47, 104, 106, 107, 109–111, 113

(56) References Cited

U.S. PATENT DOCUMENTS

| 3,754,309 | 8/1973 | Jones et al. | |
| 4,477,212 | 10/1984 | Kraft | 407/104 |
| 4,697,963 | 10/1987 | Lück | 407/105 |
| 5,494,383 | 2/1996 | Kress et al. | 408/231 |
| 5,597,270 | 1/1997 | Marin | 407/102 |

FOREIGN PATENT DOCUMENTS

| 4202295 | * | 6/1993 | (DE) . | |
| 1468529 | * | 2/1967 | (FR) | 407/109 |
| 891231 | * | 12/1981 | (SU) | 407/107 |

* cited by examiner

Primary Examiner—Steven C. Bishop
(74) Attorney, Agent, or Firm—Paul E Milliken; Ray L Weber

(57) ABSTRACT

A cutting insert for a borer or reamer comprising a flat blade having a front face with at least one cutting edge, the front face having at least one depression, or dimple, having clamping faces therein which are frustoconical and which in use engage a clamping screw whereby the blade is held in the reamer. The clamping faces extend in a direction parallel to the cutting edge, and the depth of the depression changing continuously in longitudinal cross-section.

12 Claims, 2 Drawing Sheets

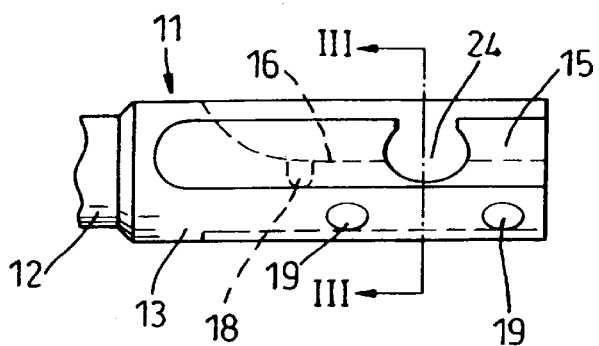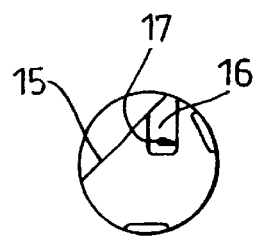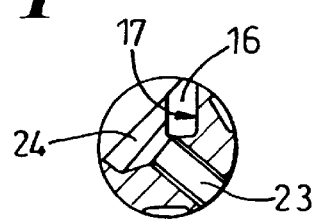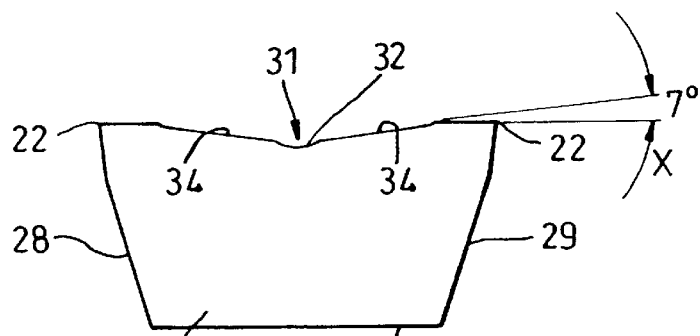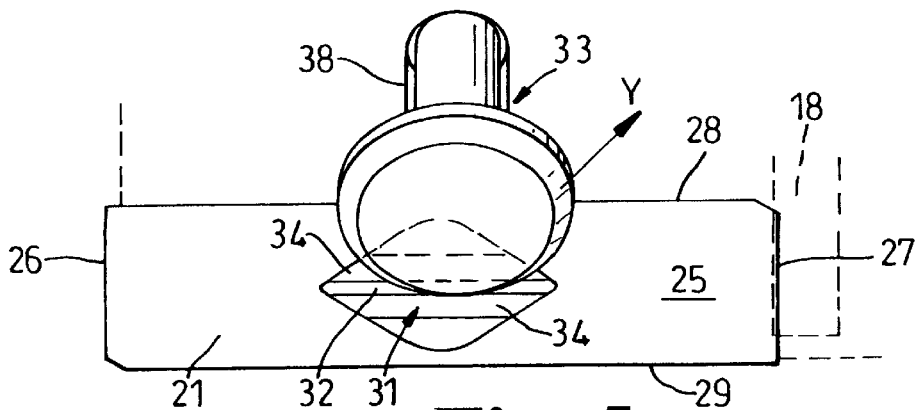

CUTTING INSERT

FIELD

This invention relates to cutting inserts for reamers and borers and to a method of securing a cutting insert to a reamer or borer.

BACKGROUND OF THE INVENTION

Borers are used for finishing holes already formed in parts and generally comprise an elongate body having a cutting blade or insert housed in a groove in the end of the body. The other end of the body may be tapered to engage a machine tool spindle.

The cutting blade or insert may be held in the groove by means of a clamping plate of the type described in U.S. Pat. No. Re. 34,054, or may be held in position by means of clamping screws, the heads of which clamp the insert against the borer body as the screw is tightened, as is shown in EP 0650 792-A. This document discloses a reamer in which the screw head has a front surface that is convex and engages in a longitudinally extending concave groove in the surface of the insert. Such a locking system locates and holds the insert against transverse movement but does not locate and hold the insert longitudinally. The insert is typically located by abutment of one end face against a stop pin in the groove.

OBJECT OF THE PRESENT INVENTION

The present invention provides a cutting insert or blade which is located and held along two axes by the clamping screws.

STATEMENTS OF INVENTION

According to the invention there is provided a cutting insert for a borer or reamer comprising a flat blade having a front face with at least one cutting edge thereon, the front surface having at least one dimple, or depression, having two clamping faces therein which are frustoconical and extend parallel to the cutting edge, the depression changing in depth longitudinally, and preferably having a base with an arcuate longitudinal cross-section.

The blade is preferably a rectangular blade, which term includes a square blade, having an elongate cutting edge.

By longitudinal is meant along a direction which is in use parallel to the axis of rotation of the borer or reamer.

Because the clamping faces are frustoconical, the depression also changes continuously in depth outwardly from a maximum depth along the transverse cross section and the depression has a shallow "V" shaped transverse cross section. Preferably the included angle between the two sides of the depression is between 160 and 170 degrees of arc, preferably about 166 degrees.

Also according to the invention there is provided a reamer or borer having a body with an axially extending cavity therein that receives a cutting insert according to the above invention and has at least one screw fastener that engages in a co-operating threaded hole in the body and which has a head which engages a clamping face in the depression to clamp the insert into the cavity.

Preferably the frustoconical portion of the head has different diameters to the frustoconical clamping faces.

The screws are preferably left handed screw threads and the head of the screw has a frustoconical portion that engages in the depression. Since the depth of the depression changes along two axes the frustoconical surface bites into the base of the depression and frictionally engages the surface of the base to hold the blade against movement along two orthogonal axes.

Yet another aspect of the invention provides a method of assembling a cutting insert into a reamer or borer having an axially extending cavity to receive the insert and a screw fastener which engages in a hole in the reamer or borer and has a fastener head which engages in a depression, or dimple, in a surface of the insert when the screw is tightened, the fastener head having a frustoconical portion which engages a respective frustoconical clamping face in the depression to hold the insert against movement along at least two orthogonal axes.

DESCRIPTION OF DRAWINGS

FIG. 1 is a side elevation of a reamer,

FIG. 2 is an end view of the reamer of FIG. 1,

FIG. 3 is a section on the line iii—iii of FIG. 1,

FIG. 4 is a transverse section of a cutting blade as used in the reamer of FIG. 1, FIG. 5 is a plan view of the cutting blade of FIG. 4 showing a retaining screw in situ.

DETAILED DESCRIPTION OF THE INVENTION

With reference to FIGS. 1 to 3 there is shown a reamer 11 comprising a shank 12 which in use is clamped into a machine tool for rotation about its longitudinal axis.

Figure 8:
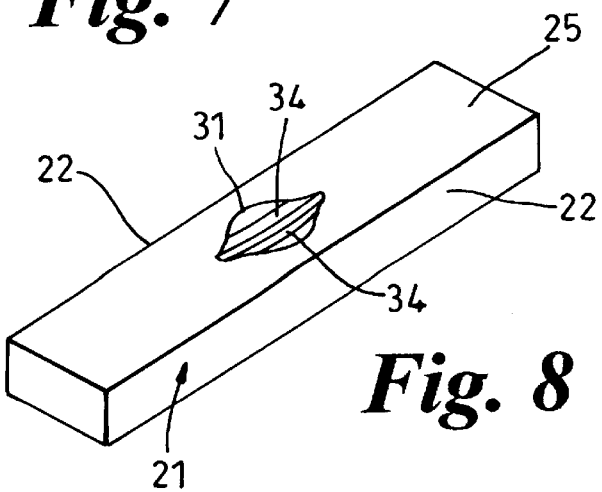
FIG. 8 is an isometric view of the cutting blade.

The reamer 11 has a head 13 which is substantially cylindrical having a flat 15 extending axially along the outer surface and with an axially extending cavity or slot 16 opening along one edge of the flat 15. The cavity 16 in use accommodates a cutting blade or insert 21 (see FIG. 8) and has a blade supporting face 17 against which a blade in use is clamped. The cavity 16 is provided at its inner end with a stop pin 18 against which one end face of the blade will locate.

The head 13 is provided with a pair of adjuster screws 19 which open into the cavity 16 for adjusting the position of the cutting edge 22 of the blade 21 beyond the outer surface of the head 13. The head is also provided with a radial screw threaded hole 23 located substantially mid-way between the adjuster screws 19, opening into a countersink 24 in the flat 15 and which opens into the cavity 16.

A cutting blade or insert 21 is shown in FIGS. 4 to 8, and is a reversible tungsten carbide blade of substantially trapezoidal transverse cross section. The blade 21 is substantially rectangular in plan, has a flat base face 24, a substantially flat front face 25 extending between two cutting edges 22, flat end faces 26, 27, and inclined sides 28, 29 which are diverging away from the base 24 to the front face 25. The blade can be reversed in the cavity 16 to use each of the two cutting edges 22.

The front face 25 of the insert has a depression 31, or dimple, formed therein which is located symmetrically about the approximate mid-length centre line and the mid width centre line of the face 25. The depth of the depression 31 is at a maximum at the approximate intersection of the two centre lines and changes continuously outwardly therefrom in the two directions along said centre lines.

The depression 31 has a base 32 which in longitudinal cross-section is arcuate, the radius of arc R being between 6 and 15 mm, preferably 12.7 mm. The base 32 is flanked on each side by a frustoconical clamping face or area 34 which extends parallel to the longitudinal axis of the blade with its axis of rotation normal to the cutting edges 22 so that, any circle that can be formed from the frustoconical portion lies in a plane parallel said longitudinal axis. In transverse cross-section, the two faces 34 are in the form of a shallow "V" shape having an included angle of between 160 and 170 degrees of arc, preferably 166 degrees, that is the sides are inclined at an angle X of about 7 degrees of arc to the flat front face 25. The depression 31 in plan view resembles an irregular hexagon, or ellipse.

The screw hole 23 is arranged so that its axis is offset relative to the mid length of the depression.

The blade 21 is held in the cavity 16 with its base 24 against the side 17, one end face 27 against the location pin 18, and one side 28 resting against the adjuster screws 19. The blade 21 is held in position by a clamping screw 33 having a screw thread 38 that engages in the cooperating threaded hole 23. Preferably the thread 38 and hole 23 are a left-handed thread. The clamping screw has head 35 with a lower frustoconical portion 36 extending outwardly from the thread to a cylindrical mid-portion 37, having a chamfered edge portion 39. The lower frustoconical portion 36 engages with the clamping faces 34 of the depression 31 as the clamping screw 33 is tightened.

Figure 6:
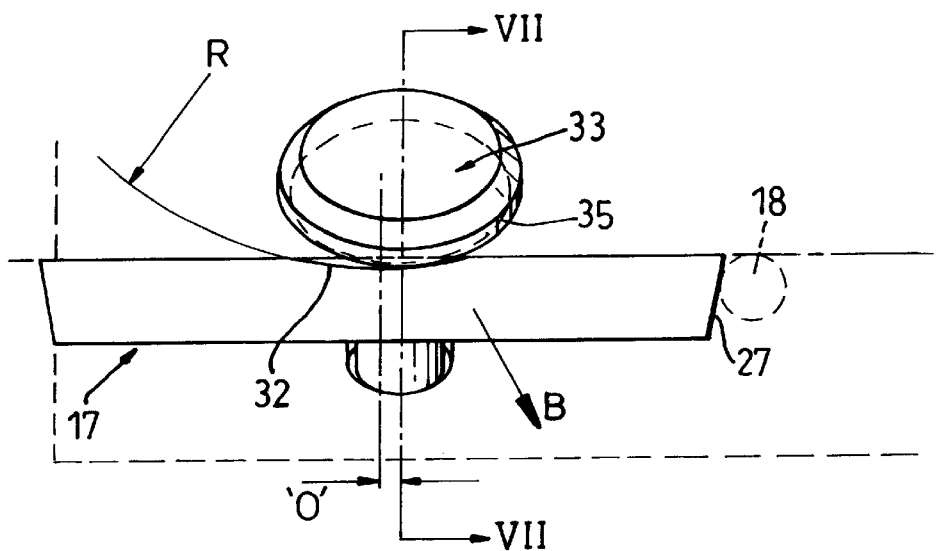
FIG. 6 is a longitudinal section through a blade showing the retaining screw in situ.
Figure 7:
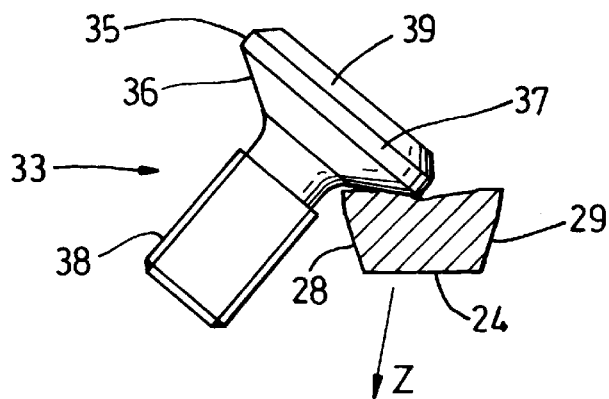
FIG. 7 is a transverse cross section of FIG. 6 taken on the line vii—vii.

As can be seen in FIG. 6, the frustoconical portion 36 of the head 35 has different diameters to the frustoconical clamping faces 34. The head 35 of the screw extends through the countersink 24 into the cavity 16 to engage the front face of the blade 21. The rotational axis of the screw 33 is offset from the longitudinal centre of the blade and depression 31 by a distance 'O' (see FIG. 6) which ensures that the screw head 35 engages with the base 32 off-centre, as shown by arrow B, so that as the screw is tightened the frictional engagement between the lower frustoconical portion 36 of the head 35 and the respective clamping face 34 urges the blade against the pin 18, down against the side surface 17 of the cavity, and against the adjusters 19, as shown by arrows Y and Z in FIGS. 5 & 7. The hole 23 is arranged so that the inclined surface of the lower portion 36 of the screw head intersects with one of the inclined faces 34 of the depression 31.

Since the base of the depression changes depth continuously outwardly from the mid-length and mid-width centres, the screw head will hold the blade against movement away from the pin 18, away from the adjusters 19, and hold it clamped against the side of the cavity; that is, the screw holds the blade against movement along at least two mutually perpendicular axes.

What is claimed is:

1. A cutting insert for a borer or reamer comprising a flat blade having a front face with at least one cutting edge thereon, the front face having at least one depression, or dimple, having clamping faces therein which are frustoconical with their axes of rotation normal to said cutting edge with said clamping faces extending in a direction parallel to the cutting edge, the depth of the depression changing continuously in longitudinal cross-section.

2. A cutting insert as claimed in claim 1, wherein the depression has a base which is arcuate in longitudinal cross-section.

3. A cutting insert as claimed in claim 2, wherein the radius of arc of the depression is between 6 mm and 15 mm.

4. A cutting insert as claimed in claim 1, wherein the two frustoconical clamping areas form a shallow 'V' shaped transverse cross-section having an included angle of between 160 to 170 degrees of arc between the two sides of the depression.

5. A cutting insert as claimed in claim 2, wherein the maximum depth of the depression is between 0.25 mm to 0.30 mm.

6. A cutting insert as claimed in claim 1 wherein the insert is an elongate rectangular insert having a pair of spaced cutting edges on the front face.

7. A reamer or borer having a body with an axially extending cavity therein that receives a cutting insert as claimed in claim 1, and at least one screw fastener that engages in a co-operating threaded hole in the body and which has a head which engages a clamping face in the depression to clamp the insert into the cavity.

8. A reamer or borer as claimed in claim 7, wherein the or each fastener has a left handed screw thread.

9. A reamer or borer as claimed in claim 7, wherein the screw fastener has a frustoconical head portion the surface of which engages a frustoconical clamping face within the depression.

10. A reamer or borer as claimed in claim 9, wherein the frustoconical surface on the screw in use is inclined relative a respective clamping face to intersect with said clamping face when the screw fastener is tightened.

11. A cutting insert as claimed in claim 4, wherein said included angle is about 166 degrees of arc.

12. A method of assembling a cutting insert, having at least one cutting edge, into a reamer or borer having an axially extending cavity to receive the insert and a screw fastener which engages in a hole in the reamer or borer and has a fastener head, wherein the fastener head engages in a depression in a surface on the insert when the screw is tightened, the fastener head having a frustoconical surface which engages with a frustoconical face having its axis of rotation normal to said one cutting edge with said face extending in a direction parallel to the cutting edge in the depression to hold the insert against movement along at least two orthogonal axes.

* * * * *